United States Patent [19]

Junker et al.

[11] Patent Number: 5,599,446
[45] Date of Patent: Feb. 4, 1997

[54] FILTER MEDIUM WITH AN EMBEDDED FRAME MOUNTED TO A SUPPORT HAVING A MATING GROOVE

[75] Inventors: Jürgen Junker; Hubertus Schütt, both of Sinsheim, Germany

[73] Assignee: Junker Filter GmbH, Sinsheim, Germany

[21] Appl. No.: 281,697

[22] Filed: Jul. 28, 1994

[30] Foreign Application Priority Data

Jul. 28, 1993 [DE] Germany .................... 43 25 235.4

[51] Int. Cl.⁶ .................................................. B01D 25/176
[52] U.S. Cl. ...................... 210/230; 210/231; 210/232; 55/DIG. 31
[58] Field of Search .................................. 210/232, 473, 210/477, 478, 499, 230, 231; 55/DIG. 31

[56] References Cited

U.S. PATENT DOCUMENTS

| | | | |
|---|---|---|---|
| 3,170,875 | 2/1965 | Sweet | 55/DIG. 31 |
| 3,255,810 | 6/1966 | Rowbottam | 55/DIG. 31 |
| 4,508,623 | 4/1985 | Heckl et al. | 210/231 |
| 4,666,596 | 5/1987 | Oelbermann et al. | 210/231 |
| 4,684,466 | 8/1987 | Terpstra | 210/231 |
| 4,931,178 | 6/1990 | Manniso et al. | 210/230 |
| 5,045,191 | 9/1991 | Fresenius | 210/231 |
| 5,051,179 | 9/1991 | Hermann | 210/231 |
| 5,102,436 | 4/1992 | Grabowski | 55/DIG. 31 |
| 5,256,312 | 10/1993 | Letersky | 55/DIG. 31 |

OTHER PUBLICATIONS

"Charcoal Filter Life", Weather-Rite Filter Company, 668 Jenks Avenue, St. Paul, Minnesota 55106, Jan. 1967.

Primary Examiner—W. L. Walker
Attorney, Agent, or Firm—Lowe, Price, LeBlanc & Becker

[57] ABSTRACT

A filter element has a carrier plate with a mounting groove which extends around a filter chamber recess. A filter cloth blank, which covers this recess, has a mounting frame which is formed on and sits in the mounting groove. The filter cloth is thus positioned easily, quickly and in a crease-free manner on the carrier plate and a liquid barrier is thus obtained at the edge of the filter cloth blank.

5 Claims, 5 Drawing Sheets

FILTER MEDIUM WITH AN EMBEDDED FRAME MOUNTED TO A SUPPORT HAVING A MATING GROOVE

FIELD OF THE INVENTION

The invention relates to a filter element such as might be used in a chamber or membrane filter, and to a method for its manufacture.

BACKGROUND OF THE RELATED ART

In the case of known filter elements for chamber and membrane filters, the filter medium blanks, which overlap the mutually opposite end faces of the support body, are extended beyond the support body edge where they are connected together by cords, wires, clips and similar. The positioning of the filter medium blanks is a time-consuming process. It is also possible for this filter element arrangement to give rise to "cross-filtration", which means that filtrate or liquid containing suspended matter is pushed outwards in the lateral direction between the plates of the filter press. This represents a disadvantage, not only as regards keeping the filter press clean, but also with respect to filter media which are detrimental to health.

A cross-filtration of this kind is eliminated in known filter elements in which the individual support bodies comprise a groove extending directly at the edge for accommodating a toroidal sealing ring and a further groove disposed inside the first groove for accommodating the edge of the filter cloth. The edge portion of the filter cloth of a filter element of this kind is driven into the second groove by means of a tool having a wide blade. This method of positioning the filter cloth is also time-consuming and requires a great deal of attention, in particular also because projecting edges must be carefully removed after the filter cloth edge has been driven in, a procedure which can be very time-consuming when the filter cloth materials consist of glass fibres or a weldable plastic.

SUMMARY OF THE INVENTION

This invention seeks to provide a filter element which eliminates cross-filtration, and enables the filter medium blank to be positioned quickly, easily and securely on the support body.

Accordingly, in a preferred embodiment, the invention provides a filter apparatus which include an essentially rigid plate-shaped support body in which openings are provided to supply a flow of a medium which is to be filtered and to remove filtrate separated from the flowing medium. flexible filter medium blank, and mounting means are provided for mounting the filter medium blank to the support body in a releasable manner. The fastening means includes a mounting frame which is cast, moulded, stuck or welded onto the edge of the filter medium blank and a circumferential mounting groove which is provided in the support body. The groove corresponds in terms of path and cross section to the mounting frame. The mounting frame comprises an essentially rigid elastic material, and is divided into at least two arms which can move elastically towards each other.

The invention enables the filter medium blank and the mounting frame, which is positioned on this blank, to be completed in the factory. It is therefore unnecessary for the user to carry out any cutting or cleaning operations. A new filter medium blank can also easily be positioned on the support body without removing the filter element from the filter press. The process of casting, moulding, sticking or welding the mounting frame onto the edge of the filter medium at the same time guarantees that this fastening point will be leakproof, so as to prevent filtrate from moving outwards in the filter medium plane.

The invention can be used with a wide variety of filter devices, for example for filter cloths for chamber or membrane filter plates of filter presses which are already provided with a milled cloth fastening groove, as already mentioned above, or as a covering for pressure filters, plane filters, vacuum plate filters or box-type filters, disc filter segments or special filter segments which are already provided with a milled cloth fastening groove.

Filter elements according to the invention can be used in solid/liquid filters in the chemical industry, the pharmaceutical industry, the petrochemical industry, the food and drinks industry, the paper industry, the plastics processing industry, in industrial and domestic waste water treatment systems and in water conditioning systems.

The filter of the present invention makes leak-free filtration in the lateral direction possible, together with substantial savings in terms of work and time when re-covering a support body. Moreover, it can ensure an optimum, crease-free snug fit when the support body is covered with the filter medium blank.

Health problems, environmental hazards and unpleasant smells are reduced as a result of the reduced possibility of cross-filtration. Maximum allowable concentration values can be attained without difficulty. The consumption of wash water for the filter press is also reduced and there is less waste water to be purified. Finally, there can also be a reduction in the noise level, which is determined by the leakage flow, when working with gaseous media as, for example, when drying products by blowing in a closed filter press.

As already indicated, the filter medium blank can be mounted and dismounted in a very simple and inexpensive manner, without any adjustment problems and without creases arising. It is not necessary to remove a filter element from the filter press for re-covering purposes. A filter element can be provided with a new filter medium blank in the press and in vertical alignment.

The material for the mounting frame and that for the actual filter medium can be selected as required by the process technology and the application technology in each individual case.

The hardness and the chemical and thermal resistance of the material for the mounting frame may also be selected with regard to the filtration process which is to be carried out in the case in question.

As the mounting frame is cast, moulded, stuck or welded onto the filter medium blank, no mechanical weakening occurs at the edge of the filter medium blank, as caused, for example, by needle penetration. Solid particles could also enter the filtrate through penetration holes.

A further advantage of the invention lies in the fact that filter media of different thicknesses can be used without modifying the support body, if these are provided only with the mounting frame which is appropriate for the support body. Conventional filter elements with a milled cloth fastening groove usually only permit one combination of a filter cloth and a toroidal sealing ring which is appropriate for the latter.

Finally, asymmetrical edge contours of the filter medium blank can easily be achieved without creases arising when putting the invention into practice.

If an elastically flexible material, especially an elastomer flexible material with a Shore hardness of approximately 70°, is used for the mounting frame, a particularly effective seal is obtained in the region of the mounting groove, even if this should become slightly soiled. This also enables the filter medium blank to be fastened at the edge in a somewhat resilient manner and the mounting frame to lock into an undercut mounting groove in a reliable yet easily releasable fashion.

Preferably, an essentially rigid mounting frame is used. This has the advantage that it is particularly easy to handle and position the filter medium blank on the support body. Preferably, the mounting frame is divided into at least two arms which can move elastically towards one another by at least one longitudinal slot provided in a holding portion.

Preferably, the mounting groove on the support body is undercut.

Preferably, the mounting groove and the mounting frame comprise torque-absorbing wall faces.

It is also possible to produce the mounting frame in situ and thus also utilize the invention with support bodies which are already in use and do not have a mounting groove which complies with a standard.

DETAILED DESCRIPTION OF THE

Figure 1:
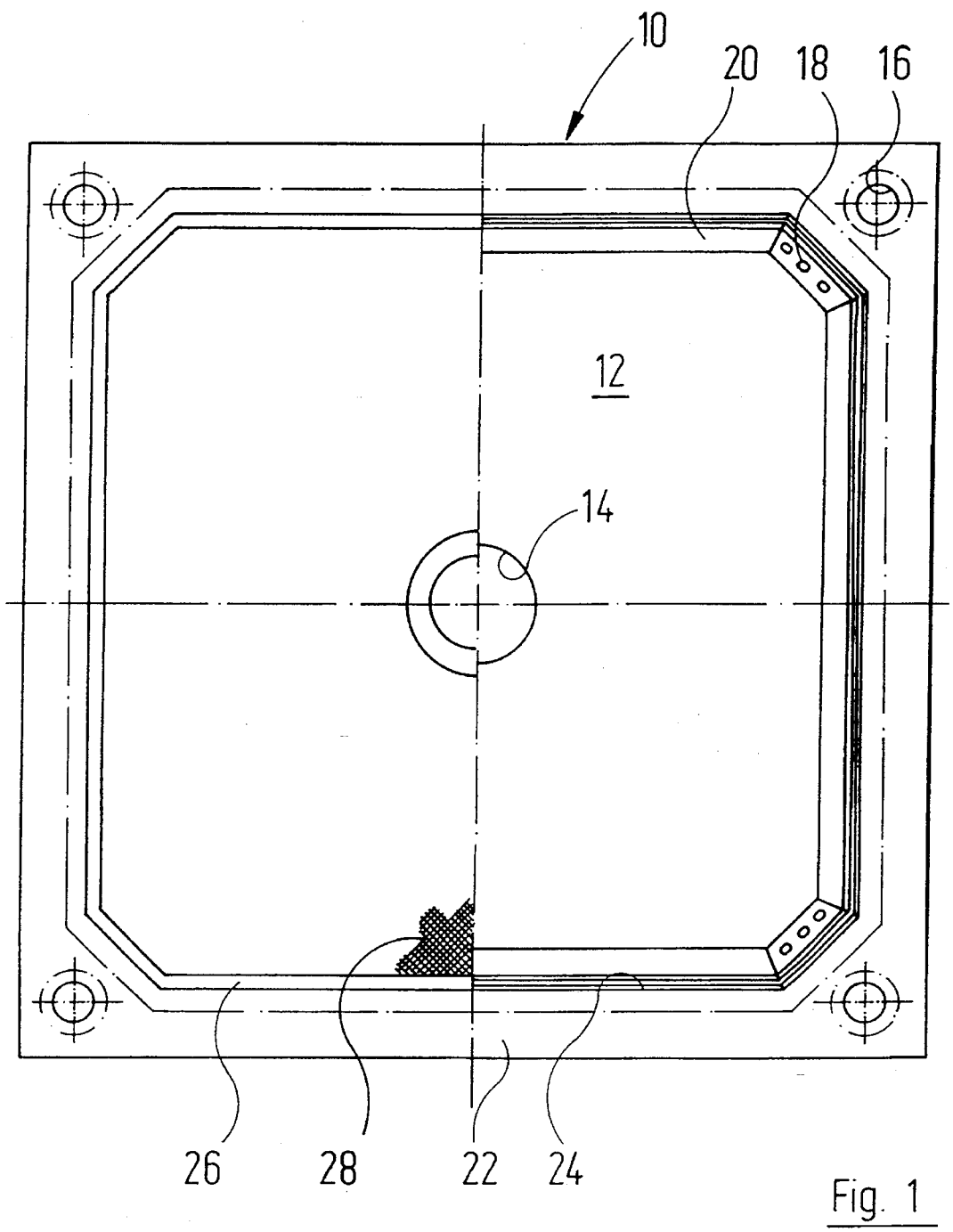
FIG.1 is a plan view onto a filter element in which the filter cloth covering has been removed from the right-hand half.

In FIG. 1 the number 10 designates a carrier plate as a whole, which is provided with a recess 12 covering the greater part of it.

Liquid which contains suspended matter and is to be filtered is supplied through a central through-opening 14, while filtrate is removed and/or washing liquid is supplied and/or gaseous treatment media such as drying air are supplied through openings 16 provided in the corner portions of the carrier plate 10. The openings 16 communicate with the recess 12 via openings 18, for example, which are formed in the sloping edge wall 20 of the recess 12.

A circumferential mounting groove 24 is provided in parallel in the edge portion 22, which lies outside of the recess 12, of the carrier plate 10. A mounting frame 26 sits positively in this groove and is formed onto the edge of a filter cloth blank 28, e.g. cast, moulded, stuck or welded onto this. Whichever of these positioning methods is selected, it is important that the filter cloth blank is not porous at the fastening point, so that liquid in the filter cloth cannot move outwards via the fastening point.

Figure 2:
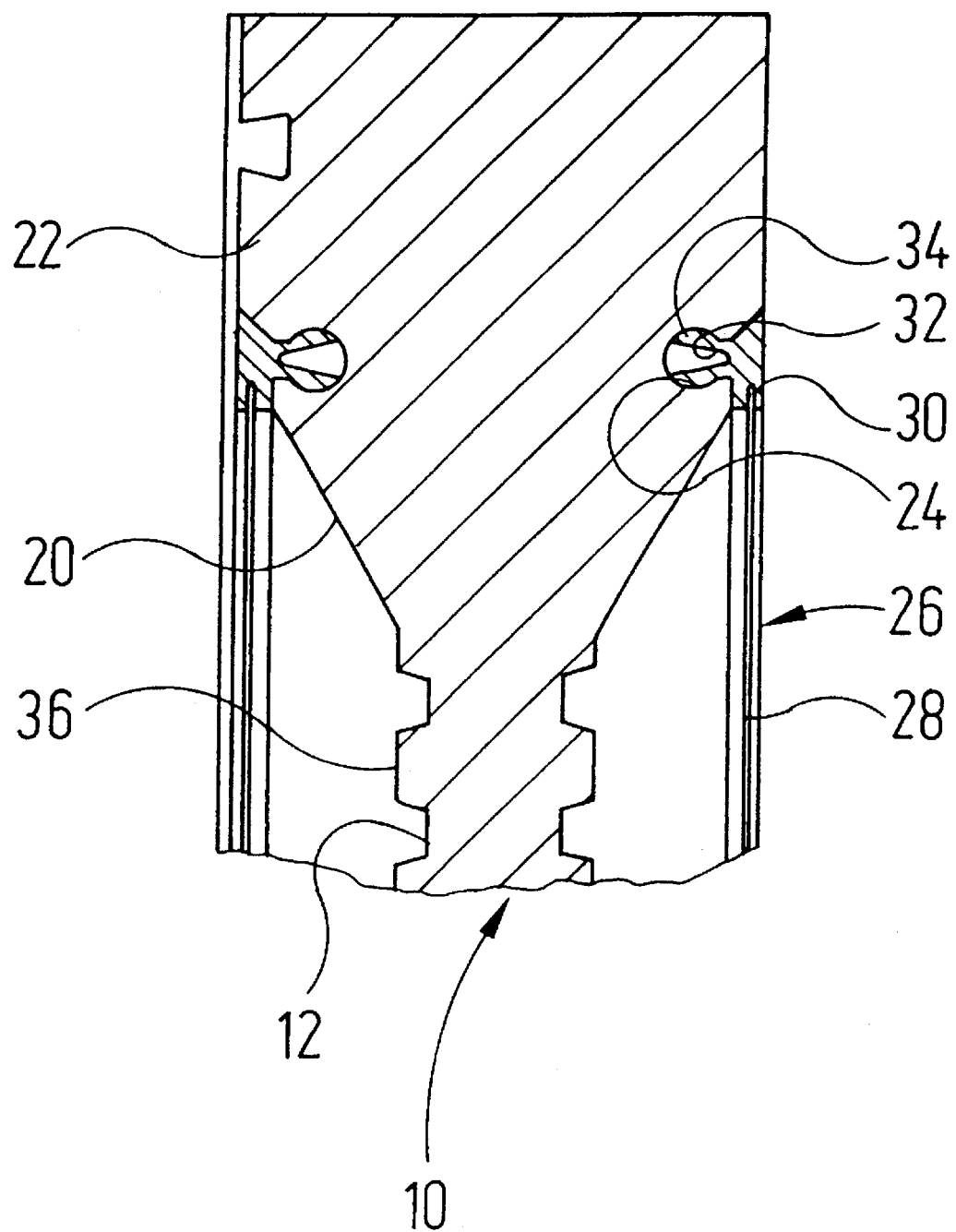
FIG. 2 is an enlarged cross section through an edge area of a carrier plate of the filter element according to FIG. 1.

FIG. 2 shows details of the way in which the edge of the filter cloth blank 28 is fastened to the carrier plate 10. In the embodiment in question the mounting frame 26 is injection moulded from an essentially rigid elastic plastic material and has an outward pointing trapezoidal cloth holding portion 30 and a cylindrical holding portion 34 which is divided into two spring arms by a longitudinal groove 32 and is clipped elastically into the mounting groove 24.

As is also shown in FIG. 2, the carrier plate 10 is formed symmetrically with respect to a central plane, so that carrier plates which are placed close together in each case define shallow filter chambers which are separated from one another by a filter cloth blank 28.

In order to prevent the filter cloth from bearing flatly against the bottom of the recesses 12 when these filter chambers are subjected to pressure, these recesses are provided with formed-on projections 36.

Figure 3:
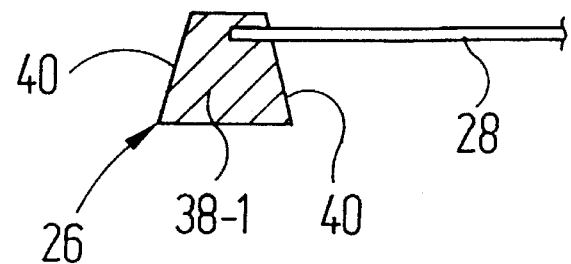
FIGS. 3 and 4 are different embodiments of the cross-section of a mounting frame which is formed onto the filter cloth blank of the filter element according to FIG. 1.
Figure 3:
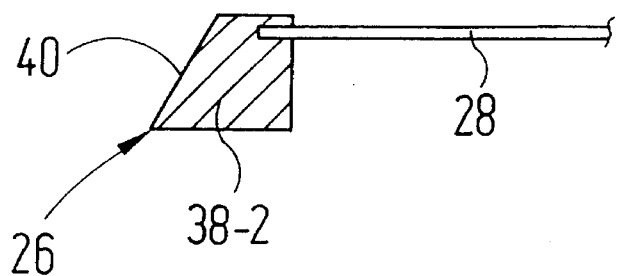
Figure 3:
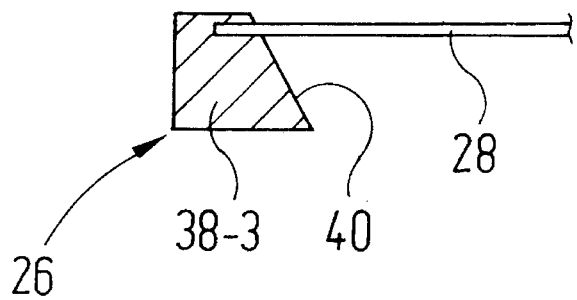
Figure 3:
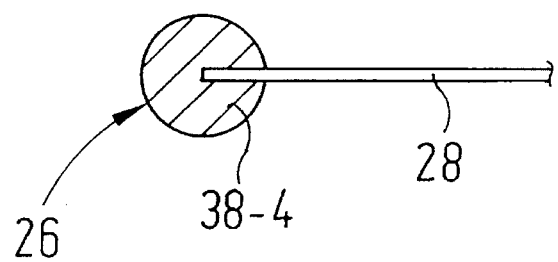
Figure 3:
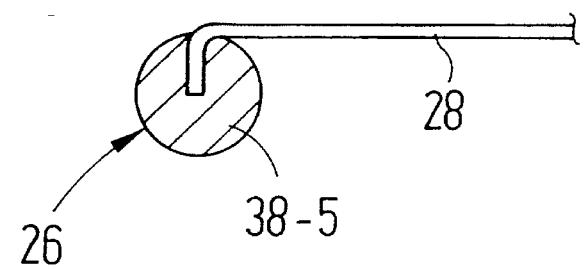
Figure 4:
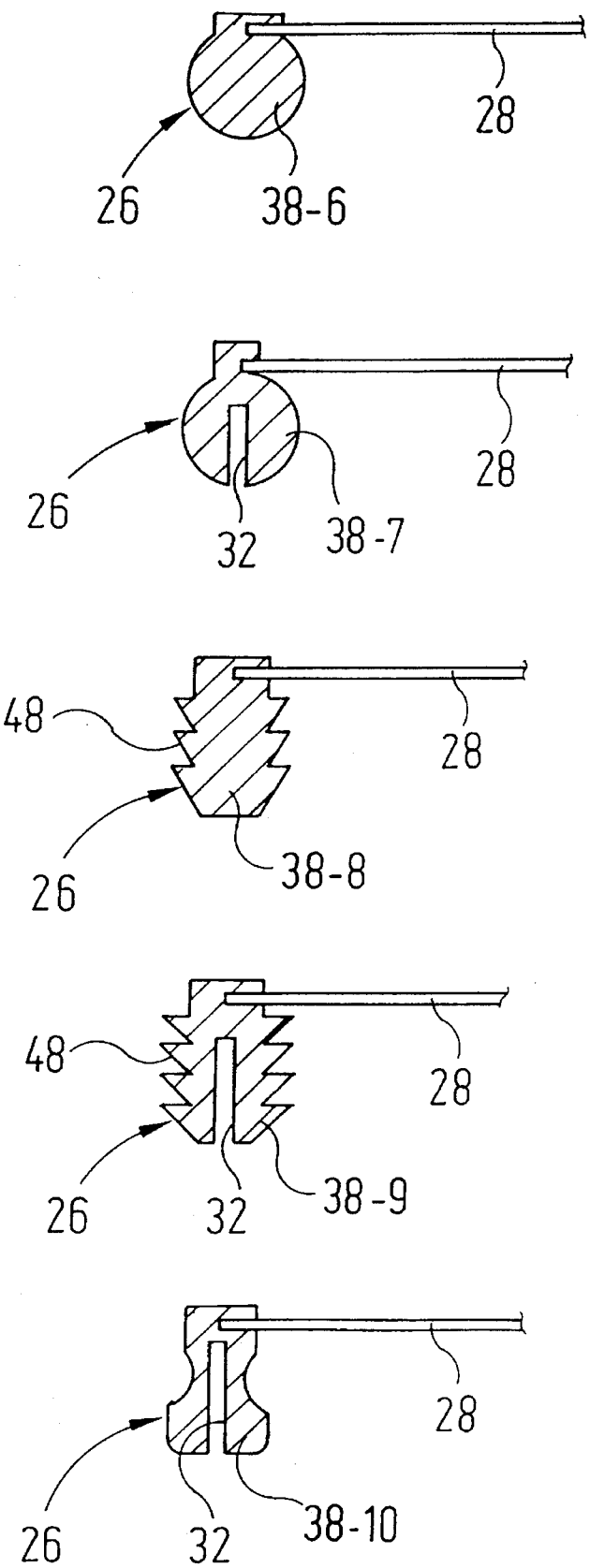

FIGS. 3 and 4 show modified cross-sectional shapes of the mounting frame 26. The geometry of the mounting groove 24 is of course always complementary to these. The different cross-sectional shapes are numbered consecutively from 38-1 to 38-10.

The cross-sectional shapes 38-1 to 38-3 each have inclined side faces 40 which, together with a correspondingly inclined wall of the mounting groove 24, may also serve to absorb higher torques. In this connection care should also be taken to ensure that the free end faces of the mounting frame 26 are in alignment with the end face of the edge portion 22, so that when filter elements come into contact the adjacent filter element provides an additional torque support for the free end face of the mounting frame 26, whether directly via the wall portion 22 of the adjacent filter element or via a membrane comprising a holding frame and provided on the adjacent filter element for pressing out the filter cake in a non-positive fashion.

The cross-sectional shapes reproduced in FIGS. 3 and 4, which are not undercut, are equally suitable for mounting frames of a rigid and an elastically flexible material. Longitudinal slots 32 are again provided, as described above, for undercut mounting grooves.

If mounting grooves 24 without undercuts are desired, yet the mounting frame 26 is still to be firmly seated in the mounting groove, the cross section of the mounting frame 26 may also have barb-like ribs 48 according to the embodiments 38-8 and 38-9.

The filter cloth blank 28 of the embodiments described above is cut in the filter factory to the edge contour which is the right one for each case and also provided with the mounting frame 26 in the factory.

Figure 5:
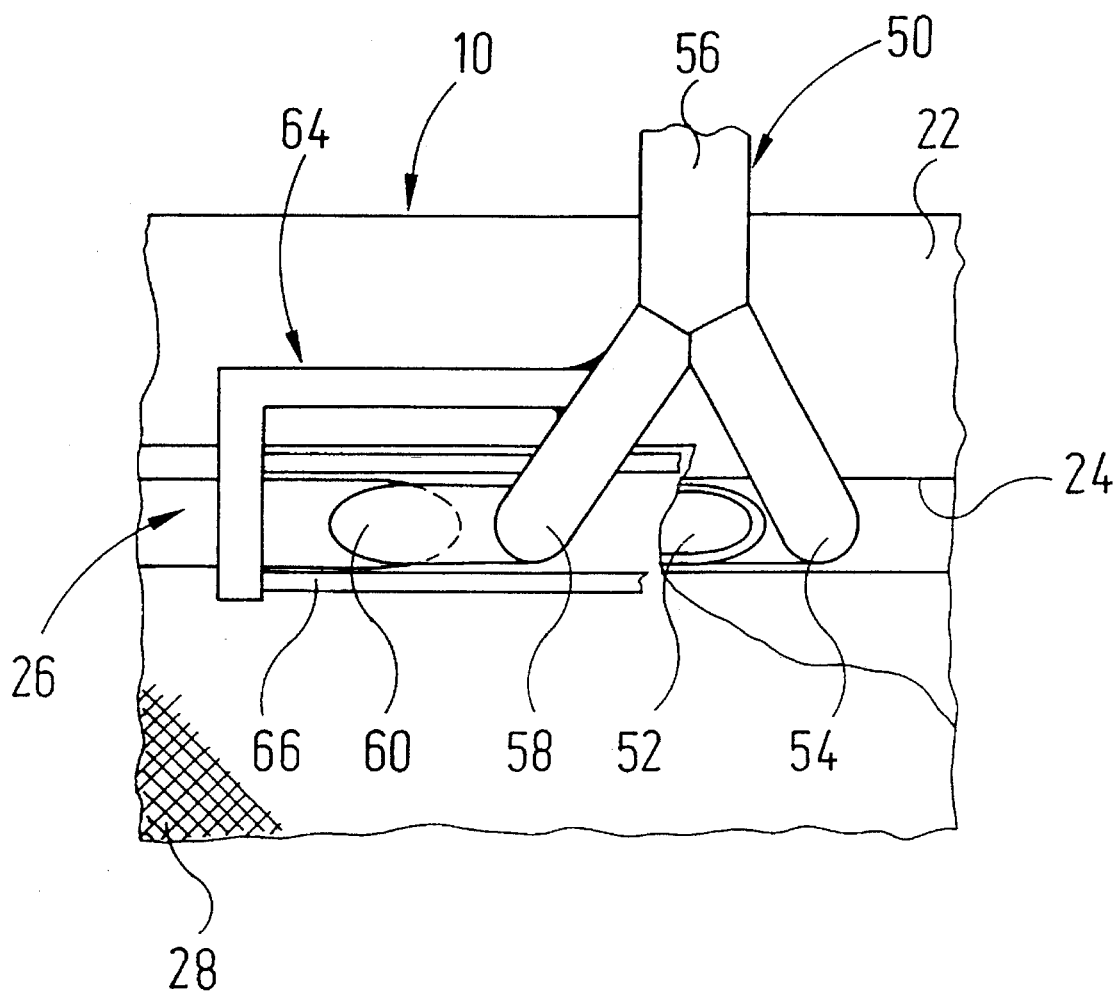
FIG. 5 is a diagrammatic view of a delivery head which can be used to produce a mounting frame in situ on a filter cloth blank.

For some applications it may also be of advantage to position the mounting frame in situ, e.g. in the case of existing carrier plates which are provided with filter cloth fastening grooves which are not of a standard cross section or have already been damaged by harsh conditions of use. This can easily be carried out by means of the delivery head shown in FIG. 5 and designated as a whole by 50.

This has a first delivery piece 52, which engages in a displaceable manner in the holding groove 24, comprises a delivery opening directed upwards and in the longitudinal direction of the groove and is connected via a first elbow 54 to a feed piece 56. The latter receives liquid or pasty plastic material, possibly provided with an expanding agent, by means of a conveying device, which is not shown in detail. A second delivery piece 60 is connected to the feed piece 56 via a second elbow 58, the downward pointing delivery opening of which piece 60 is in fact essentially in alignment with the delivery opening of the delivery piece 52 in a direction normal to the plane of the carrier plate 10 and which engages over the edge of a filter cloth blank 28 to be provided with a mounting frame. The two delivery pieces 52 and 60 are not shown in their true position in FIG. 5 solely to provide a better view. In practice the delivery head 50 is as short as possible in the longitudinal direction of the groove so that it can be moved through curved portions of the holding groove 24.

A mounting frame 26 can then be positioned as follows:

The filter cloth blank 28 is positioned over the carrier plate 10, e.g. by means of two adhesive tape pieces, with its upper longitudinal edge correctly aligned, the edge of the blank in this embodiment preferably extending slightly beyond the mounting groove 24, as indicated in FIG. 1 by the dot-dash line 62. The material supply having been connected, the delivery head 50 is then moved along the vertical and the lower horizontal portions of the mounting groove 24, the latter being filled with plastic material and an aligned plastic material strip being deposited on the outside of the filter cloth. The two portions of plastic material coalesce through the filter cloth, which is either porous or perforated in places.

The delivery head 50 may comprise a tightened holding-down device 64 with pressure strips 66, which run along both sides of the sprayed plastic strip, so as to prevent the filter cloth edge from rising during and immediately after the mounting frame 26 has been moulded on.

After the mounting frame 26 has thus been closed on three sides, the adhesive tapes provided at the upper longitudinal edge of the blank are removed and the mounting frame 26 is completely closed at the top.

According to the application and use, materials from the following group are used for the filter cloth blank 28: woven fabric, non-woven or needle felts consisting of monofilament, multifilament or staple fibres and combinations thereof. The actual fibres may consist of PP, PAN, PA, PES, PE, PVDF, PPS, PVDCL, PEEK, PTFE, Aramid, glass, high-grade steel or ceramic.

According to the method which is employed and the respective application, in particular according to the chemical and thermal loads, materials from the following group may be used to manufacture the mounting frame 26: polyurethane, silicone, epoxy resin, PP, PAN, PA, PES, PE, PVC, PVDF, PPS, PVDCL, PTFE or a ceramic material.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A filter element, comprising:

(a) an essentially rigid plate-shaped support body, in which openings are provided to supply a flow of a medium to be filtered and to remove a filtrate separated from the medium to be filtered;

(b) a flexible filter medium blank; and (c) means for releasably mounting the filter medium blank to the support body, the mounting means comprising a mounting frame which is cast, moulded or welded onto an edge portion of the filter medium blank so as to embed the edge portion of the filter medium blank, wherein the support body is formed to have a circumferential mounting groove which corresponds in shape and cross-section to the mounting frame, wherein the mounting frame comprises an elastically flexible material, and wherein the filter medium blank comprises a material which is selected from a group consisting of woven fabric, non-woven or needle felts consisting of monofilament, multifilament or staple fibres and combinations thereof.

2. The filter apparatus according to claim 1, wherein:

comprises an elastomer material with a Shore hardness of approximately 70°.

3. The filter apparatus according to claim 1, wherein:

the mounting groove is undercut.

4. The filter apparatus according to claim 1, wherein:

the mounting groove and the mounting frame comprise torque-absorbing wall faces.

5. The filter apparatus according to claim 1, wherein:

the mounting frame comprises a material which is selected from a group consisting of polyurethane, silicone, epoxy resin, PP, PAN, PA, PES, PE, PVC, PVDF, PPS, PVDCL, PTFE, ceramic.

\* \* \* \* \*